April 11, 1961     J. R. BAITTINGER     2,978,874
SPLICER CLIP UNIT FOR H-BEAM BEARING PILES
Filed April 6, 1959     2 Sheets-Sheet 1
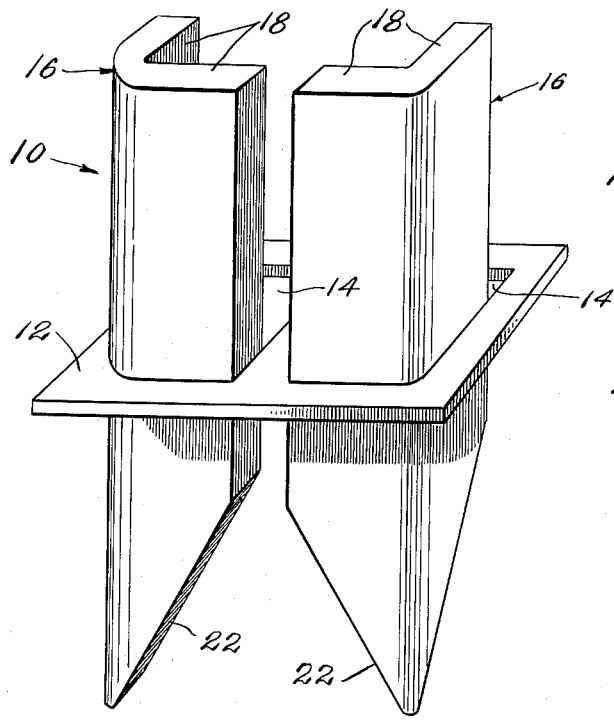
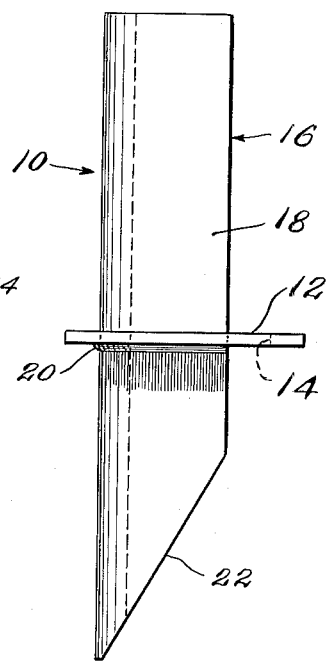
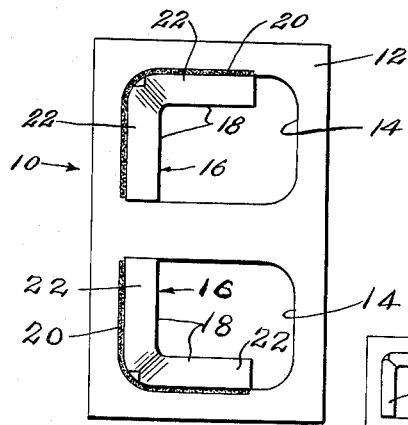
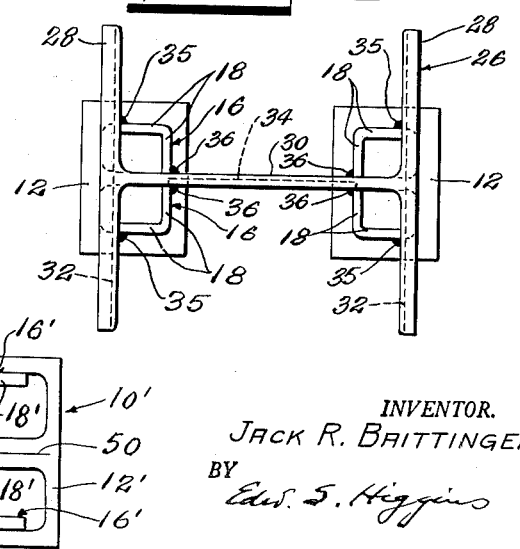
INVENTOR.
JACK R. BAITTINGER
BY
Edw. S. Higgins
ATTORNEY

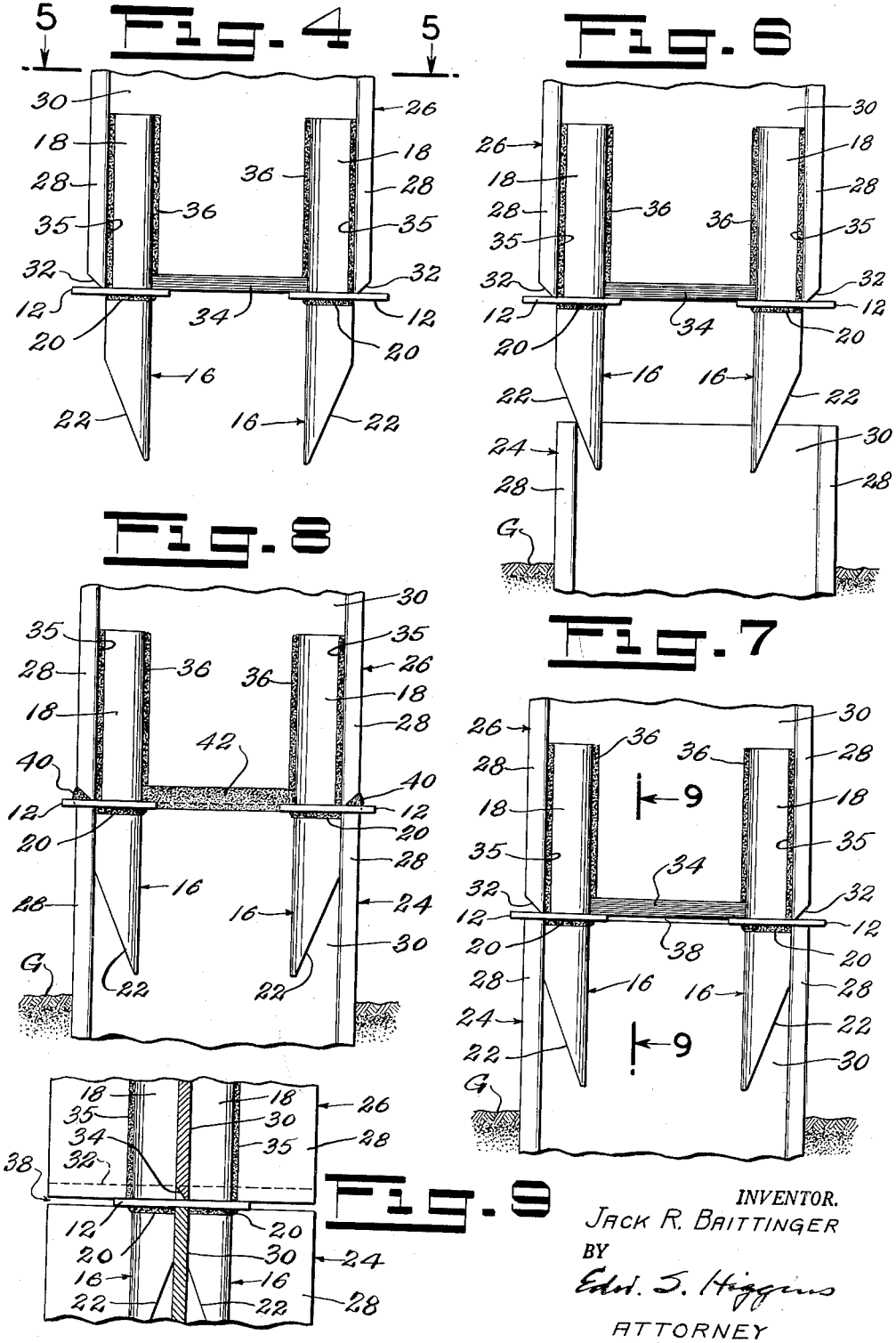

United States Patent Office 2,978,874
Patented Apr. 11, 1961

2,978,874
SPLICER CLIP UNIT FOR H-BEAM
BEARING PILES

Jack R. Baittinger, 2 Wheatley Court, Scotch Plains, N.J., assignor of one-half to John J. Dougherty, Cedar Grove, N.J.

Filed Apr. 6, 1959, Ser. No. 804,200

1 Claim. (Cl. 61—53)

This invention relates to a clip for making a splice in an H-beam bearing pile and to a method of splicing together two H-beam bearing pile sections.

A principal object of the present invention is to provide a splice clip of this kind that will properly guide a movable H-beam bearing pile section which is suspended in the air into alignment with a fixed H-beam bearing pile section partially driven into the ground. Heretofore when a splice is necessary between two H-beam bearing pile sections, the driving of the lower section of such a spliced beam is discontinued when the top of the lower section is at a predetermined elevation which will make the splicing operation safe, convenient and economical. The splicing operation is performed in a vertical position. The upper and lower pile sections must be accurately aligned to avoid unnecessary stresses caused by eccentricity of the splice axis in the final driving of the spliced pile, particularly under hard driving conditions or where the pile is to penetrate into the rock.

Another object of the invention is to provide such a splice clip that will space the ends of the H-beam bearing pile sections that are to be joined so that a predetermined uniform dimension between the beam sections will exist. This will prevent the ends of the beam sections from touching and will control the distance between the ends of the beam sections to provide exact and ideal conditions for all types of welding as applied to such a splice.

Another object of the invention is to provide such a splice clip that will quickly and accurately position the parts of the H-beam bearing pile sections to be spliced in a single simple operation. Heretofore the beam sections were spaced by shims of one form or another in order to obtain proper welding conditions or the beam sections were allowed to touch. The shims are placed by hand so that the operation is uncertain and hazardous for the men performing the work. Where the beam sections are allowed to touch the full efficiency of the weld cannot be realized. My invention contemplates the production of a splice clip that provides full efficiency of the specific weld without unnecessary hazard to personnel.

Another object of the invention is to provide such a splice clip that will quickly and accurately position any structural members that are suitable and adaptable to the disclosed principles and it is not the intention or purpose of this disclosure to limit the application of the splice clip to any single purpose.

Another object of the invention is to provide such a splice clip that will quickly and accurately position the parts of an H-beam bearing pile that are to be joined regardless of differences in the dimensions of the beam pile sections created by allowable published tolerances. Two beam sections of the same size and weight per foot can, under the presently accepted standards, vary in all cross-sectional dimensions within certain prescribed limits. It is therefore necessary to provide adjustment to compensate for a difference which might result when one beam section is a minimum while the other beam section is maximum in all dimensions under the existing tolerances.

Another object of the invention is to provide such a splicer clip that is inexpensive to produce, light in weight and easy to apply.

Another object of the invention is to provide such a splicer clip fabricated from parts produced by casting, forging, or forming metal parts that will be held in their proper relationship one with another by welding, riveting, bolting or other mechanical means.

For further comprehension of the invention and of the objects and advantages thereof reference will be had to the accompanying drawings forming a material part of this disclosure wherein:

Fig. 1 is a perspective view of a splicer clip unit embodying my invention.

Fig. 2 is a view looking from the right of Fig. 1.

Fig. 3 is a bottom plan view thereof.

Fig. 4 is a side elevational view showing a step in the operation of splicing H-beam bearing pile sections.

Fig. 5 is a view looking down from the top of Fig. 4 along the line 5—5 of Fig. 4.

Fig. 6 is a side elevational view showing a succeeding step in the splicing operation.

Fig. 7 is a side elevational view showing the next succeeding step in the splicing operation.

Fig. 8 is a side elevational view of the completed splined H-beam bearing pile.

Fig. 9 is a vertical sectional view taken on the plane of the line 9—9 of Fig. 7.

Fig. 10 is a view similar to Fig. 3 showing a modified form of splicer clip unit, on a reduced scale.

Referring in detail to the drawings, in Fig. 1 a splicer clip unit made in accordance with the present invention is shown and designated generally by the reference number 10. The splicer clip unit 10 comprises a rectangular-shaped metal plate member 12, shown to best advantage in Fig. 3 having a pair of spaced substantially rectangular-shaped openings 14, 14. One corner of each opening is squared and the remaining three corners are round, the squared corners being in opposed relation. The plate is preferably $5/32$ of an inch thick. A metal guide bar 16 is vertically disposed in each opening 14. Each metal guide bar comprises an angular body, L-shaped in cross-section, constituted by two sides 18, 18. The guide bars are disposed perpendicularly to the plane of the plate and are welded to the plate approximately midway between their ends as indicated at 20. One end of each bar, the top end as viewed in Fig. 1 is flat, and the other end, the bottom end, is cutaway at both sides forming tapered edges 22, tapering downwardly and outwardly toward the juncture of the sides of the bar. The tapered edges 22 of one pair of tapered edges are in opposed relation as shown in Fig. 1. The splicer clip unit just described is assembled at the factory.

The splicer clip 10 is particularly adapted for splicing together two elongated sections of an H-beam bearing pile, such as the pile sections 24 and 26 shown in Fig. 6. Each H-beam bearing pile section comprises a pair of spaced end flanges 28, 28 connected at their centers by a web 30. The lower edges of the flanges 28, 28 as well as the lower edge of the web 30, as viewed in Fig. 6, of the upper pile section 26 are bevelled or scarfed as indicated at 32 and 34, respectively. The upper end edge of the lower pile section 24 as shown in Fig. 6 is flat.

The splicing of the H-beam bearing pile sections is done at the site of the job. One section of the pile, the section 24, for example, is partially driven into the ground G to a fixed position with a portion thereof protruding above the ground as seen in Fig. 6. While the other section 26 is on the ground, the splicer clip unit 10 is applied thereto by inserting the unit upwardly and inwardly of and adjacent to each end flange 28, with the adjacent long edges of the sides 18 of the guide bars 16 sliding along on opposed sides of the web 30 until the plate 12 contacts the bottom bevelled edges of the adjacent flanges 28 and the bottom bevelled edge of the web 30. The relative positions of the splicer clip units and the upper section 26 will be such as seen in Fig. 5. At this time, the long end edges of one side 18 of the guide bars are in contact with the adjacent flanges 28, and the other long end edge of the other sides 18 are in contact with the web 30 as shown in Fig. 5. The contacting long end edges are secured to the flanges and to the web by welding as indicated at 35 and 36, respetcively. The splicer clip units 10 thus becomes a unitary part of the upper pile section 26 as seen in Fig. 4.

The pile section 26 with splicer clip units 10 attached is then swung over the fixed pile section 24 approximately into alignment therewith. The section 26 with the guide bars 16 of the splicer clip units extending therefrom is lowered onto the lower fixed pile section 24 and if the sections are not in true alignment, the tapering surfaces or edges 22 of one of the pair of guide bars 16, the guide bar 16 at the left of Fig. 6, for example, of each clip unit, engages the edge of the adjacent flang 28 on the fixed pile section 24 and cams or shifts the guide bar and attached pile section 26 into true alignment with the fixed section. Continued lowering will thus bring the plate 12 into seating and contacting engagement with the top flat edge of the fixed pile section 24. When the parts are thus in contacting relation, as shown in Fig. 7, it wll be noted that there is a space 38 between the beveled edge 34 of the web 30 of section 26 and the adjacent top edge of the web 30 of the lower fixed section 24 of the pile, said space being equal in width to the thickness of the plate 12, in this instance 5/32 of an inch. With the parts contacting as shown in Fig. 7, the bevelled edges of the flanges 28 of the top section 26 and the plates 12 are rigidly secured together at these points by welding as indicated at 40, and the closely spaced end edges of the webs 30 of the sections 24 and 26 are rigidly secured together by welding as indicated at 42, as shown in Fig. 8.

The sections 24 and 26 are thus rigidly spliced together to form a unitary pile structure. This unitary pile structure is driven into the ground in the usual manner. During this driving operation, the projecting portions of the plates 12 are sheared or torn off flush with the outer surface of the flanges 28, the thinness of the metal of the plates permitting this shearing.

A modified splicer clip unit 10' is shown in Fig. 10 and differs from the form of splicer clip unit 10 shown in Figs. 1–9 in that the plate 12' is split at its centrally solid portion as indicated at 50, the split intersecting one long edge of the plane and extending to a point just short of the other long edge. This permits the halves of the plate to spread slightly in case an H-beam bearing pile having a web portion slightly thicker than the space between the adjacent long edges of the sides 18' of the guide bars 16' is inserted between said edges. This split also compensates for mill rolling tolerances in thickness of beam web.

While I have illustrated and described the preferred embodiments of my invention, it will be understood that changes in details of construction might be made without departing from the principle of the invention and I desire therefore to be limited only by the state of the prior art and the appended claim.

What I claim is:

A splicer clip unit for guiding sections of an H-beam bearing pile into alignment for splicing comprising a rectangular plate having a pair of spaced rectangular-shaped openings therein, and a pair of elongated bars disposed in said openings perpendicularly to the plane of the plate, said bars being L-shaped in cross-section, each bar disposed in a corner and extending to an adjacent corner, said bars being secured to the plate intermediate their ends, one end portion of the bars protruding on one side of the plate and the other end portion protruding on the opposite side of the plate, one of the protruding end portions having its long edges tapered, the other of the protruding end portions having a flat end edge, the bars being arranged in the openings with their long edges in opposed closely spaced relation, the plate defining a space between the surfaces to be welded corresponding to its thickness when the beam sections are in aligned position preparatory to welding, said plate having a split centrally thereof between the openings therein, said split intersecting one long edge of the plate and extending to a point just short of the other long edge thereof.

References Cited in the file of this patent
UNITED STATES PATENTS

| | | |
|---|---|---|
| 1,188,485 | Pruyn | June 27, 1916 |
| 1,858,918 | DeVou | May 17, 1932 |
| 2,141,107 | Greulich | Dec. 20, 1938 |
| 2,211,375 | Greulich | Aug. 13, 1940 |
| 2,708,828 | Pruyn | May 24, 1955 |
| 2,874,547 | Fiore | Feb. 24, 1959 |